(12) United States Patent
Lee

(10) Patent No.: US 6,379,047 B1
(45) Date of Patent: Apr. 30, 2002

(54) FLUID BEARING APPARATUS

(75) Inventor: Chang-woo Lee, Kyonggi-do (KR)

(73) Assignee: Samsung Electronics Co., Ltd., Kyungki-Do (KR)

(*) Notice: Subject to any disclaimer, the term of this patent is extended or adjusted under 35 U.S.C. 154(b) by 0 days.

(21) Appl. No.: 09/430,138

(22) Filed: Oct. 29, 1999

Related U.S. Application Data

(62) Division of application No. 08/988,823, filed on Dec. 11, 1997, now Pat. No. 6,017,150.

(30) Foreign Application Priority Data

Dec. 13, 1996 (KR) .............................. 96-65434
Dec. 26, 1996 (KR) .............................. 96-72122

(51) Int. Cl.⁷ .............................................. F16C 17/04
(52) U.S. Cl. ........................................................ 384/123
(58) Field of Search ............................... 384/123, 121, 384/112, 292, 291

(56) References Cited

U.S. PATENT DOCUMENTS 3,870,382 A    3/1975    Reinhoudt

*Primary Examiner*—Lenard A. Footland
(74) *Attorney, Agent, or Firm*—Sughrue Mion, PLLC

(57) ABSTRACT

A fluid bearing apparatus having a strengthened force for supporting a rotating member, which includes a herring bone-shaped dynamic pressure generating section and a spiral dynamic pressure generating section. A portion of the herring bone-shaped dynamic pressure generating section or the spiral dynamic pressure generating section is interrupted, or the spiral dynamic pressure generating section is connected to an end of the herring bone-shaped dynamic pressure generating section in order to prevent an operational fluid for generating a fluid pressure from counterflowing due to high speed rotation of the operational fluid.

6 Claims, 3 Drawing Sheets

FIG. 1
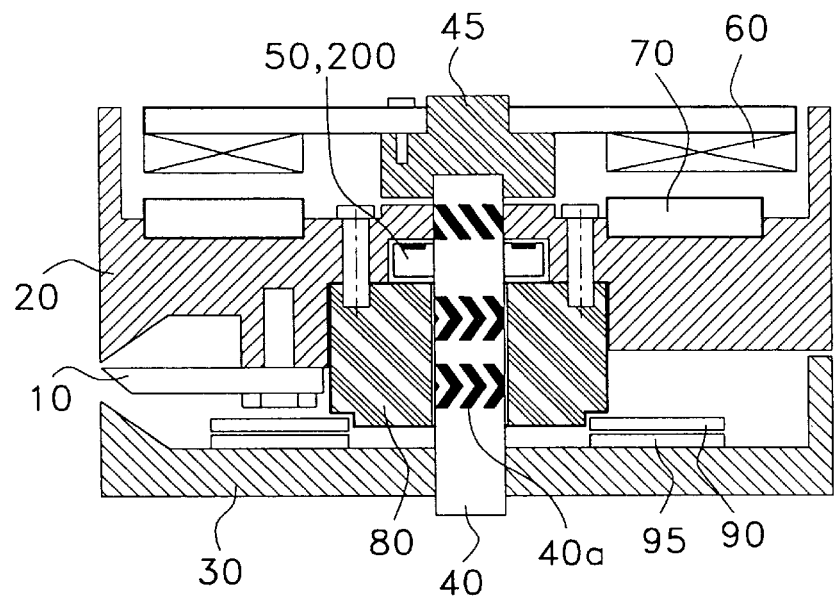
FIG. 2A
(Prior Art)
FIG. 2B
(Prior Art)
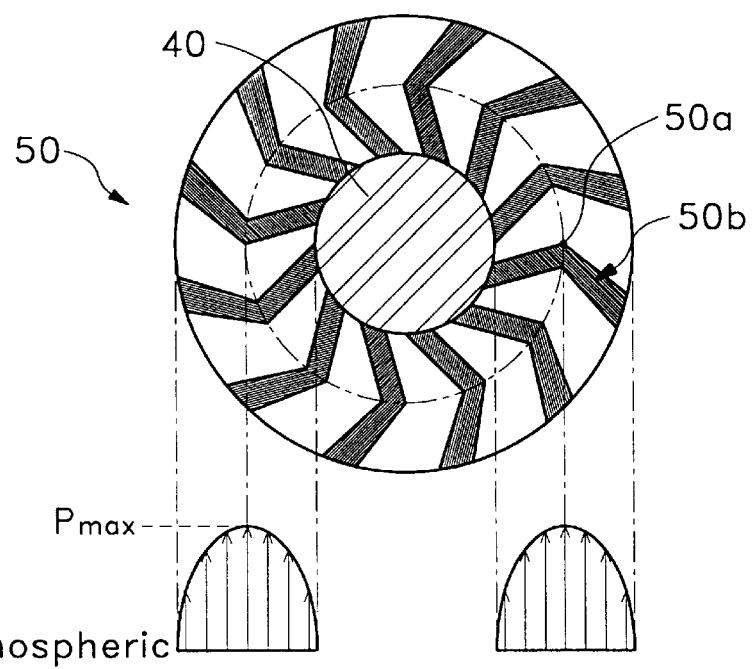

FLUID BEARING APPARATUS

This is a divisional of application Ser. No. 08/988,823 filed Dec. 11, 1997, U.S. Pat. No. 6,017,150 the disclosure of which is incorporated herein by reference.

BACKGROUND OF THE INVENTION

1. Field of the Invention

The present invention relates to a fluid bearing apparatus and, more particularly, to a fluid bearing apparatus wherein a thrust bearing includes a dynamic pressure generating groove for generating fluid pressure for supporting the thrust load of a rotating member and a counterflow protecting dynamic pressure generating groove for preventing an operational fluid fed into the dynamic pressure generating groove from counterflowing. This results in an strengthened supporting force of a fluid bearing apparatus, for supporting the rotating member.

2. Description of the Related Art

With the recent improvement of technologies in information media industries such as computers, audio systems, image instruments, and the like, there has been a trend to minimize the sizes of the above media. Accordingly, much smaller, more minute and highly functional devices are required for them.

In the computer industry, a spindle motor of a hard disk driver (HDD) that is one of the memory devices, a scanning motor of a laser printer that is an information instrument, a disk driving motor for reading audio and video signals of a laser disk and a compact disk of an audio system, and in the image displaying industry, a video tape recorder (VTR) head and a camcorder driving apparatus and the like, commonly save, search and read predetermined data by high-speed revolutions of shafts connected to a driving apparatus.

For enhancing the efficiency of the above instruments, super high-speed revolutions of the shafts are required. However, the super high-speed revolutions of the shafts may cause irregular vibrations and oscillations.

The irregular vibrations and oscillations occurring when the shafts are rotated at a super high velocity, may serve as a critical factor of degradation in efficiency of such an accurately operating instrument. Accordingly, each of the instruments includes a bearing that is one of the elements for overcoming the disadvantages associated with the vibrations and oscillations due to the high-speed revolutions of the shafts. Variously modified bearings have recently been provided for solving problems of the shafts by minimizing friction occurring thereon. Among the bearings, fluid bearings using air or oil as an operational fluid are widely used, and are especially suitable for super high-speed revolutions.

FIG. 1 is a cross sectional view of a VTR head driving apparatus and which illustrates the location of a conventional fluid bearing apparatus such as thrust bearing 50, or the thrust bearing 200 of the present invention. The VTR head driving apparatus comprises: an upper drum 20 which is rotatable and on which a head tip 10 is installed, the head tip 10 for reading video and audio signals written on a VTR tape; a fixed lower drum 30 which has the same center as the rotation center of the upper drum 20 and is in contact with the VTR tape at an outer circumference thereof; a thrust bearing 50 having a ring shape, which supports a thrust load of the upper drum 20 and is press-fitted onto a fixed shaft 40; and a rotational power generating unit 60 and 70 for generating power for rotating the upper drum 20 including the head tip 10 at a super high velocity. The reference number 45 represents a hub for connecting a stator 60 of the rotational power generating unit 60 and 70 thereto.

FIG. 2A is a top view of the conventional thrust bearing.

The thrust bearing 50 has a ring shape including a through hole to which the shaft 40 is press-fitted.

The thrust bearing 50 includes a dynamic pressure generating groove 50b on a top surface thereof that contacts with the upper drum 20. The dynamic pressure generating groove 50b generates a predetermined fluid pressure by gathering a fluid in a direction as a result of high-speed rotation of the upper drum 20.

Preferably, the dynamic pressure generating groove 50b has a curved portion 50a that is arranged on a circle (shown by a one-dot chain line in FIG. 2A) established along centers between the inner periphery and the outer periphery of the thrust bearing 50. The curved portion 50a has an inner angle of less than 180 degrees.

The ends of the dynamic pressure generating groove 50b extend to the inner periphery and the outer periphery of the thrust bearing 50, respectively. A plurality of dynamic pressure generating grooves 50b as aforementioned are radially formed around the center of the thrust bearing 50.

The operation of the VTR driving apparatus including the dynamic pressure generating grooves 50b will be described hereinafter.

The upper drum 20 that has been stationary is rotated at a high velocity by the rotational power generating unit 60 and 70. As a result, an operational fluid, such as an oil having a high viscosity, between the top surface of the thrust bearing 50 and the upper drum 20 begins to be rotated in a direction of the rotation of the upper drum 20 due to a boundary friction occurring between solid and fluid.

At this time, the rotated operational fluid is fed into the dynamic pressure generating grooves 50b formed on the top surface of the thrust bearing 50 at a predetermined velocity. After being fed into the dynamic pressure generating grooves 50b, the operational fluid is guided toward the curved portions 50a from the two ends of the dynamic pressure generating grooves 50b, in other words, from the outer periphery of the thrust bearing 50 to the curved portions 50a and from the inner periphery of the thrust bearing 50 to the curved portions 50a. The operational fluid flowing toward the curved portions 50a is then dashed against each other at the curved portions 50a. As a result, the fluid pressure at the curved portions 50a is rapidly increased by a vector sum of the operation fluid flowing in the counter directions against each other (see FIG. 2B).

The fluid pressure is proportional to the number and the area of the dynamic pressure generating grooves 50b, and the rotational velocity of the upper drum 20.

Accordingly, when the fluid pressure generated in the dynamic pressure generating grooves 50b by the rotation of the upper drum 20 becomes larger than the load of the upper drum 20 by rotation of the upper drum 20 by a predetermined velocity, the upper drum 20 is accurately rotated at a constant velocity in spaced apart relation from the thrust bearing 50 by several μm with the operational fluid between the upper drum 20 and the thrust bearing 50.

However, when the operational fluid is rotated by the boundary friction, the rotated fluid changes its movement in the opposite direction, i.e., from the center of the thrust bearing to the outer periphery of the thrust bearing due to the inertia force and the centrifugal force thereof. As a result, in the dynamic pressure generating grooves, the operational fluid does not flow toward the curved portions. Conversely, the operational fluid counterflows in the opposite direction, i.e., from the curved portions to the inner periphery of the thrust bearing and the outer periphery of the thrust bearing.

SUMMARY OF THE INVENTION

It is therefore an object of the present invention to provide a fluid bearing apparatus which is operative to prevent an operational fluid fed into dynamic pressure generating grooves of a thrust bearing thereof from counterflowing, and thereby strengthening a force for supporting a rotating member thereof.

The above and other objects are provided according to the present invention by providing a fluid bearing apparatus comprising: a body; a bearing section which extends upward from a top surface of the body and is formed as a single body with the body; a dynamic pressure generating section which is formed on a top surface of the bearing section, and generates a predetermined dynamic pressure when a rotating member thereof is rotated with respect to the bearing section; and a fluid counterflow protecting section which is formed adjacent to the dynamic pressure generating section on the top surface of the body, and prevents an operational fluid fed into the dynamic pressure generating section from counterflowing.

Preferably, the fluid counterflow protecting section is formed around the center portion of the bearing section, and the dynamic pressure generating section is formed around the fluid counterflowing section.

Preferably, the dynamic pressure generating section is formed around the center portion of the bearing section, and the fluid counterflow protecting section is formed around the dynamic pressure generating section.

Preferably, the fluid counterflow protecting section and the dynamic pressure generating section are separated from each other by a separating member.

Preferably, the fluid counterflow protecting section and the dynamic pressure generating section are connected to each other in a single section.

Preferably, the dynamic pressure generating section includes a groove having a spiral shape.

Preferably, the fluid counterflow protecting section includes a groove having a herring bone shape.

Preferably, the fluid counterflow protecting section includes a groove having a spiral shape.

Preferably, the fluid counterflow protecting section includes a groove having a lozenge shape.

BRIEF DESCRIPTION OF THE DRAWINGS

The above objects and advantages of the present invention will become more apparent from the following detailed description when read in connection with the accompanying drawings, in which:

FIG. 1 is a cross sectional view of a VTR driving apparatus;

FIG. 2A is a top view of a conventional thrust bearing;

FIG. 2B is a graph of fluid pressure generated on the thrust bearing of FIG. 2A;

DETAILED DESCRIPTION OF THE PREFERRED EMBODIMENTS

The fluid bearing apparatus according to the present invention will be hereinafter described in detail, referring to the accompanying drawings. For description purposes, elements having basically the same function as previously described conventional elements are identified using common reference numbers throughout the drawings, and detailed descriptions thereof are omitted below.

Figure 3A:
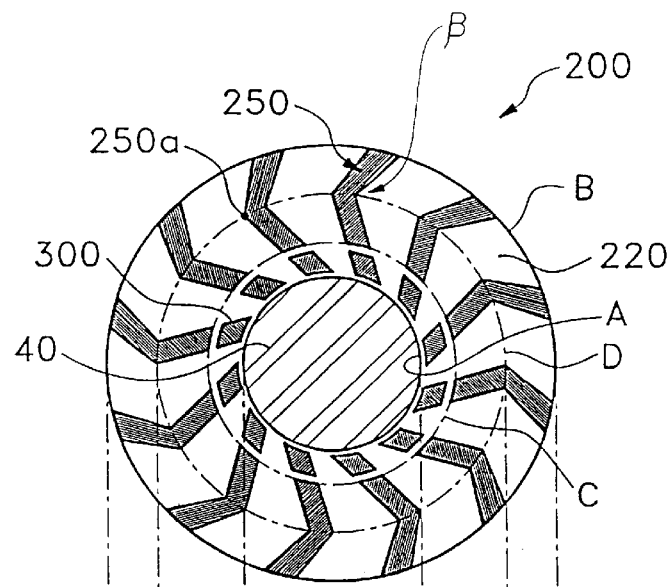
FIG. 3A is a top view of an embodiment of a thrust bearing according to the present invention.
Figure 3B:
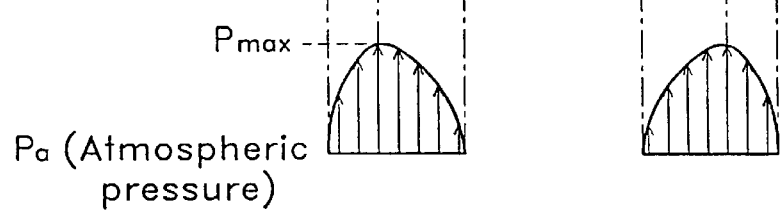
FIG. 3B is a graph of fluid pressure generated on the thrust bearing of FIG. 3A.

Referring to FIGS. 1, 3A and 3B, a VTR head driving apparatus comprises: an upper drum 20 which is rotatable and includes a head 10 for reading video and audio signals written on a VTR tape; a lower drum 30 which is fixed; a thrust bearing 200 having a ring shape and which supports a rotational center and a thrust load of the upper drum 20. The thrust bearing 200 is press-fitted onto a fixed shaft 40. A first dynamic pressure generating groove 250 (see FIG. 3A) is formed on a top surface of the thrust bearing 200 and includes a counterflow protecting section 300. A rotational power generating unit is provided and includes a rotor 70 and a stator 60 which rotate the upper drum 20 at a super high and constant velocity.

The shaft 40 includes a second dynamic pressure generating groove 40a (see FIG. 1) having a herring bone shape, on an outer side thereof. A bushing 80 having a diameter that is larger than the diameter of the shaft 40 by several $\mu$m is connected to the upper drum 20. The bushing 80 supports a radial load generated when the upper drum 20 is rotated at a high velocity by dynamic pressure generated by the second dynamic pressure generating groove 40a.

In addition, each of the upper drum 20 and the bushing 80 includes a sealing cover (not shown) for protecting leakage of the operational fluid, i.e., air or oil, fed into the first dynamic pressure generating groove 250 and the second dynamic pressure generating groove 40a, out of the VTR head driving apparatus.

The rotational power generating unit includes the stator 60 which is fixed to a top surface of the shaft 40, and the rotor 70 which is mounted in the upper drum 20. The reference numbers 95 and 90 represent a stator transformer and a rotary transformer that is spaced apart from the stator transformer 95 by several $\mu$m, respectively.

FIG. 3A shows an embodiment of the thrust bearing 200 according to the present invention.

As shown in FIG. 3A, the thrust bearing 200 according to the present invention mainly includes: a bearing section 220; the dynamic pressure generating groove or section 250 which is formed on the top surface of the bearing section 220, and generates dynamic pressure when upper drum 20 is rotated with respect to the bearing section 220; and the fluid counterflow protecting groove or section 300 which protects fluid fed into the dynamic pressure generating groove 250 from counterflowing.

The bearing section 220 has a ring shape with a predetermined height and an inner diameter that is a little smaller than the outer diameter of the shaft 40, so that the bearing section 220 can be press fitted onto the shaft 40. The inner periphery and the outer periphery of the bearing section 220 will be designated as A and B, respectively.

On the top surface of the bearing section 220, the first dynamic pressure generating groove 250 is formed. The first dynamic pressure generating groove 250 generates a predetermined dynamic pressure by rotation of the upper drum 20 that is in contact with the bearing section 220.

The shape of the first dynamic pressure generating groove 250 formed on the thrust bearing 200 will now be described below.

On the top surface of the bearing section 220 between the inner periphery A and the outer periphery B, a first concentric circle C and a second concentric circle D are established. The first concentric circle C is larger than A and smaller than B. The second concentric circle D is larger than C and smaller than B.

Along the second concentric circle D, a plurality of first dynamic pressure generating grooves 250 are formed. Preferably, the plurality of first dynamic pressure generating grooves 250 are radially arranged at predetermined intervals around the center of the bearing section 220.

The plurality of first dynamic pressure generating grooves 250 may be formed on the top surface of the bearing section 220 or on the upper drum 20 that is opposed to the thrust bearing 200. Preferably, in the present invention, the plurality of first dynamic pressure generating grooves 250 are formed on the bearing section 220.

Figure 4:
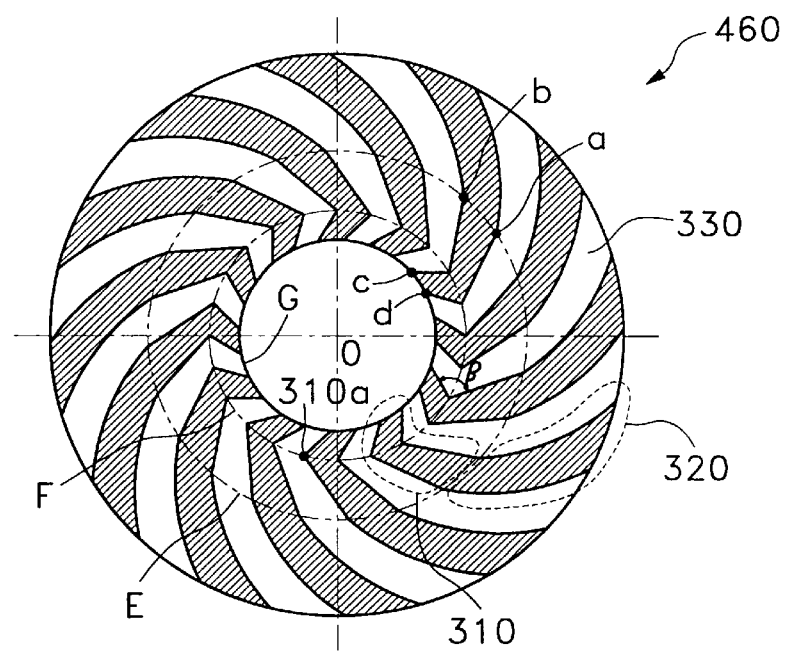
FIG. 4 is a top view of another embodiment of a thrust bearing according to the present invention.

Once locations are determined, the plurality of first dynamic pressure generating grooves 250 are formed on the determined locations between the outer periphery B and the first concentric circle C in the shape of a herring bone having curved portions 250a with an inner angle of β degrees (see FIG. 4). The curved portions 250a are located on the second concentric circle D.

At this time, it is important that counterflow protecting dynamic pressure generating grooves 300 are formed opposed to inner ends of the first dynamic pressure generating grooves 250 that contact the first concentric circle C. The counterflow protecting dynamic pressure generating grooves 300, which each have a lozenge shape in FIG. 3A, protect the operational fluid fed into the first dynamic pressure generating grooves 250 from counterflowing and leaking out to the inner periphery A due to centrifugal force generated by super high speed rotation of the upper drum 20.

The first dynamic pressure generating grooves 250 are separated from the counterflow protecting dynamic pressure generating grooves 300 by a separating member. If the first dynamic pressure generating grooves 250 have a herring bone shape, the counterflow protecting dynamic pressure generating grooves 300 may be connected to the first dynamic pressure generating grooves 250 in a single section.

The operation of the VTR head driving apparatus including the thrust bearing according to the present invention on which the first dynamic pressure generating grooves 250 and the counterflow protecting dynamic pressure generating grooves 300 are formed, will be described with reference to the accompanying drawings.

First, when-power is supplied to the stator 60 fixed to the shaft 40, and the rotor 70 formed in the rotary upper drum 20, the upper drum 20 is rotated about the shaft 40. Then, the head 10 installed on the upper drum 20 is accordingly rotated to read video and audio signals of a video tape.

In order to support a thrust load of the upper drum 20 and minimize a friction induced during the rotations of the upper drum 20, a predetermined operational fluid is fed into the first dynamic pressure generating grooves 250 which are formed on the top surface of the thrust bearing 200 and have a herring bone shape. The operational fluid fed into the first dynamic pressure generating grooves 250 is moved from the ends of the first dynamic pressure generating grooves 250 to the curved portions 250a.

The rotational velocity of the operational fluid is important. As aforementioned, the operational fluid is fed into the first dynamic pressure generating grooves 250 in predetermined directions. However, as time passes, the rotation of the operational fluid is gradually accelerated. When the operational fluid is rotated at a rotational velocity that is the same as the upper drum 20, the operational fluid counterflows in a direction of a centrifugal force by an inertia force and a centrifugal force of the fluid generated by the rotation. As a result, fluid bearing apparatus requires counterflow protecting dynamic pressure generating grooves 300.

The counterflow protecting dynamic pressure generating grooves 300 pump the operational fluid in only one direction which is from the inner periphery A to the outer periphery, and push the operational fluid back away from the counterflow protecting dynamic pressure generating grooves 300 toward the first dynamic pressure generating grooves 250. As a result, a loss of fluid pressure that may be caused by the counterflow of the operation fluid can be minimized.

The graph of FIG. 3B shows a fluid pressure generated by the first dynamic pressure generating grooves 250 and the counterflow protecting dynamic pressure generating grooves 300.

The upper drum 20 is rotated in spaced apart relation from the thrust bearing 200 by several $\mu$m as a result of a maximum fluid pressure area $P_{max}$ shown in FIG. 3B.

Figure 5:
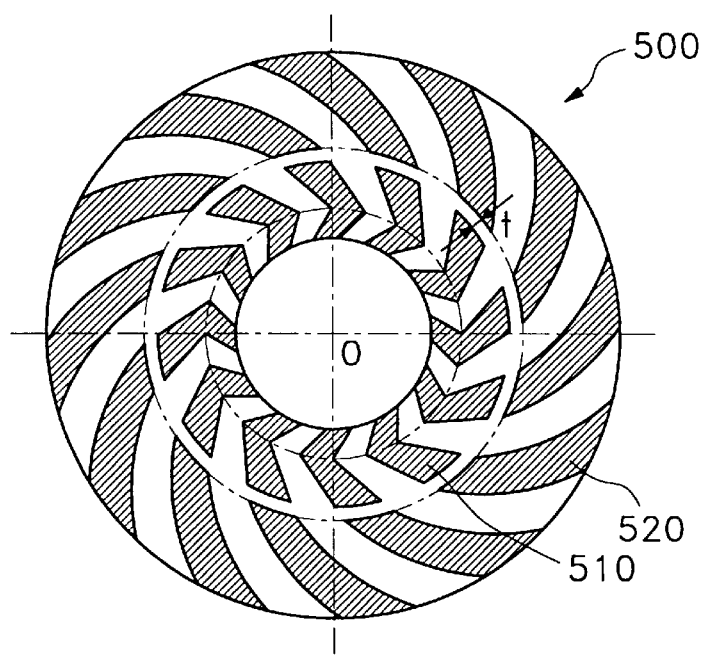
FIG. 5 is a top view of still another embodiment of a thrust bearing according to the present invention.

FIGS. 4 and 5 illustrate other embodiments of the present invention.

In the embodiments of FIGS. 4 and 5, the thrust bearing for supporting a thrust load includes dynamic pressure generating grooves which are formed in an inner portion thereof in a herring bone shape. Each of the dynamic pressure generating grooves includes a curved portion.

Dynamic pressure generating grooves having a spiral shape are formed on an outer portion of the thrust bearing and connected to the herring bone-shaped dynamic pressure generating grooves. The spiral dynamic pressure generating grooves protect the operational fluid from counterflowing in the herring bone shaped dynamic pressure generating grooves. The other embodiments of the present invention will be described in detail with reference to the accompanying drawings.

Referring to FIG. 4, the thrust bearing 460 comprises: a bearing section 330; first dynamic pressure generating grooves 310 which are formed in spaced apart relation from a center of the bearing section 330 by a predetermined distance; and counterflow protecting dynamic pressure generating grooves 320.

The first dynamic pressure generating grooves 310 have a herring bone shape. Each of the counterflow protecting dynamic pressure generating grooves 320 has a spiral shape and is connected to each of the first dynamic pressure generating grooves 310 in a single connected groove.

A concentric circle G is formed along locations radially spaced apart from the center O of the bearing section 330 of the thrust bearing 460 by a predetermined distance. A concentric circle E is formed along locations spaced apart from the concentric circle G by a predetermined distance in a direction of the outer periphery of the thrust bearing 460. A concentric circle F is formed along the centers between the concentric circles G and E. Between the concentric circles G and E, the herring bone shaped dynamic pressure generating grooves 310 are formed. Each of the herring bone-shaped dynamic pressure generating grooves 310 includes a curved portion 310a. The curved portions 310a of the herring bone-shaped dynamic pressure generating grooves 310 are located on the concentric circle F on which maximum fluid pressure is generated. Two ends of each of the herring bone-shaped dynamic pressure generating grooves 310 are designated as an arc ab and an arc cd, respectively.

The arc ab that is an end of each of the herring bone-shaped dynamic pressure generating grooves 310 formed to the concentric circle E is connected to an end of each of the spiral dynamic pressure generating grooves 320, which has a depth and an area that are the same as the herring bone-shaped dynamic pressure generating grooves 310. The spiral dynamic pressure generating grooves 320 extend to the outer periphery of the thrust bearing 460.

The herring bone-shaped dynamic pressure generating grooves 310 and the spiral dynamic pressure generating grooves 320 serve as first dynamic pressure generating grooves of the thrust bearing 460. Among them, the spiral dynamic pressure generating grooves 320 especially serve as counterflow protecting dynamic pressure generating grooves for protecting the operational fluid from counterflowing. The counterflow of the operational fluid may prevent generation of a predetermined fluid pressure in the herring bone-shaped dynamic pressure generating grooves 310.

The operation of the thrust bearing including such counterflow protecting dynamic pressure generating grooves 320 will be described hereinafter.

When power is supplied to the stator and the rotor (see FIG. 1), the rotor 70 begins to be rotated. Then, the upper drum 20 connected to the rotor 70 is accordingly rotated.

At this time, an operational fluid between the thrust bearing 460 and the upper drum 20 is rotated in a direction of rotation of the upper drum by a boundary friction generated between the upper surface of the bearing section 330 of the thrust bearing 460 and the upper drum 20 according to the rotational velocity of the upper drum 20.

The fluid is moved into the spiral dynamic pressure generating grooves 320 and the herring bone-shaped dynamic pressure generating grooves 310 successively. The fluid moved into the herring bone-shaped dynamic pressure generating grooves 310 is gathered at the curved portions 310a of the herring bone-shaped dynamic pressure generating grooves 310. As a result, the fluid generates a peak fluid pressure.

The upper drum 20 is then raised from the bearing section 330 of the thrust bearing 460 by the peak fluid pressure. As a result, the upper drum 20 is rotated in spaced apart relation from the thrust bearing 460.

At this time, the spiral dynamic pressure generating grooves 320 pump the operational fluid into the herring bone-shaped dynamic pressure generating grooves 310, and prevent the operational fluid from counterflowing from the curved portions 310a of the herring bone-shaped dynamic pressure generating grooves 310 due to an inertia force and a centrifugal force generated by the high speed rotation of the fluid. Furthermore, the spiral dynamic pressure generating grooves 320 can be designed to provide a larger amount of fluid into the herring bone-shaped dynamic pressure generating grooves 310.

The operational fluid fed into the herring bone-shaped dynamic pressure generating grooves 310 from the spiral dynamic pressure generating grooves 320 generates a maximum fluid pressure at the curved portions 310a of the herring bone-shaped dynamic pressure generating grooves 310.

FIG. 5 is another embodiment of the present invention. The herring bone-shaped dynamic pressure generating grooves 510 do not have to be connected to the spiral dynamic pressure generating grooves 520. As shown in FIG. 5, the herring bone-shaped dynamic pressure generating grooves 510 are separated from the spiral dynamic pressure generating grooves 520 by a separating member having a thickness t without any degradation of the efficiency of the thrust bearing.

It is contemplated that numerous modifications may be made to the fluid bearing apparatus of the present invention without departing from the spirit and scope of the invention as defined in the following claims.

What I claim is:

1. A fluid bearing apparatus comprising:

a body;

a bearing section which extends upward from a top surface of said body, and is formed integrally with said body;

a dynamic pressure generating section which is formed on a top surface of said bearing section, and generates a predetermined dynamic pressure when a rotating member is rotated with respect to said bearing section; and a fluid counterflow protecting section which is formed adjacent to said dynamic pressure generating section on the top surface of said bearing section, and protects an operational fluid fed into said dynamic pressure generating section from counterflowing out of said dynamic pressure generating section, wherein said dynamic pressure generating section is formed around a center of said bearing section, and said fluid counterflow protecting section is formed around said dynamic pressure generating section.

2. The fluid bearing apparatus according to claim 1, wherein said dynamic pressure generating section comprises a groove having a spiral shape.

3. The fluid bearing apparatus according to claim 2, wherein said fluid counterflow protecting section comprises a groove having a spiral shape.

4. The fluid bearing apparatus according to claim 1, wherein said dynamic pressure generating section comprises a groove having a herring bone shape.

5. The fluid bearing apparatus according to claim 4, wherein said fluid counterflow protecting section comprises a groove having a spiral shape.

6. The fluid bearing apparatus according to claim 1, wherein said fluid counterflow protecting section and said dynamic pressure generating section are connected to each other in a single section.

* * * * *